June 25, 1929.  J. A. BADURA  1,718,728
ANIMAL YOKE
Filed July 24, 1928
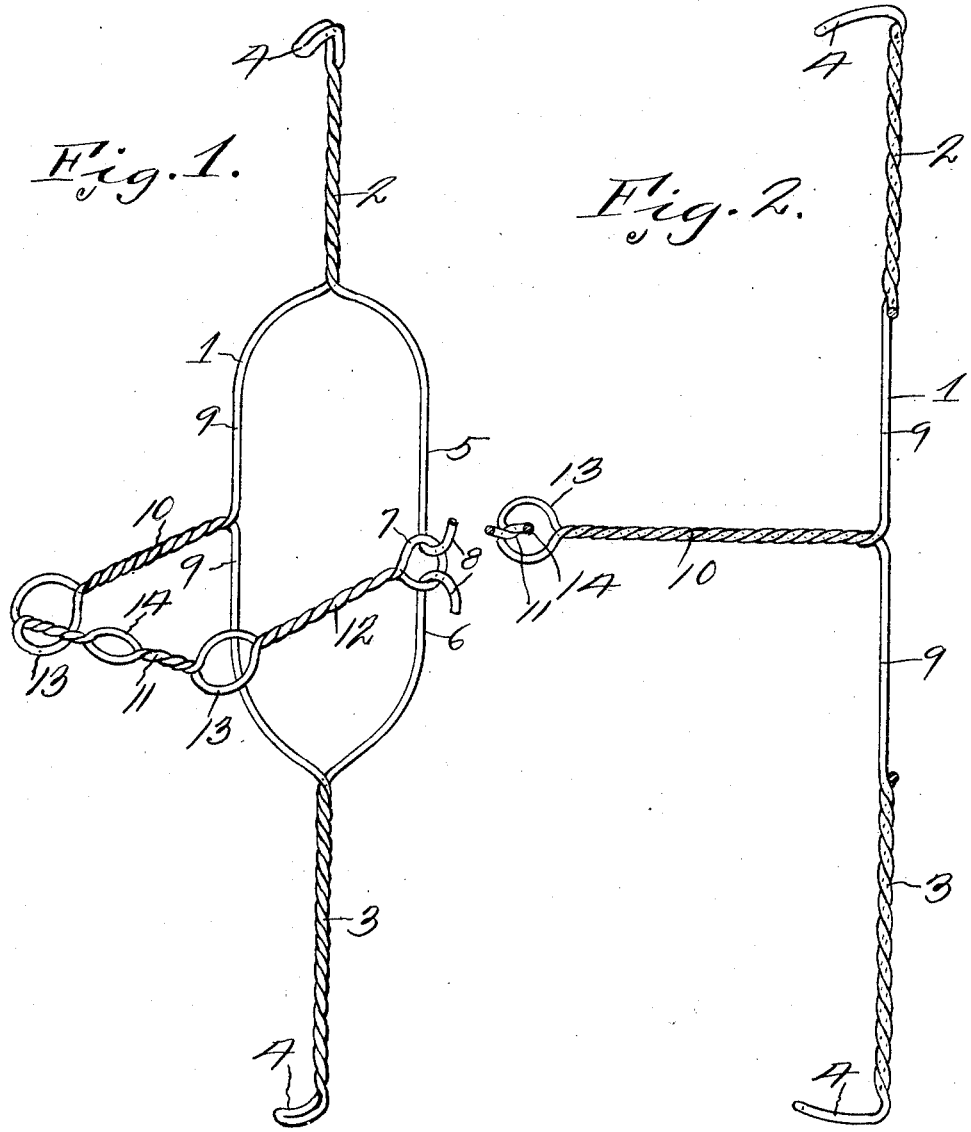
Inventor
John A. Badura
By Philip A. H. Ferrell
Attorney Patented June 25, 1929.

1,718,728

UNITED STATES PATENT OFFICE.

JOHN A. BADURA, OF ASHTON, NEBRASKA.

ANIMAL YOKE.

Application filed July 24, 1928. Serial No. 295,050.

The invention relates to yokes for cattle and has for its object to provide a device of this character wherein the yoke is provided with upwardly and downwardly extending arms terminating in hooks, adapted to hook over and under wires of fences, thereby preventing the animal from passing over the fence.

A further object is to provide in connection with the yoke forwardly extending arms at opposite sides thereof terminating in a transversely disposed bit adapted to be received in the animal's mouth for preventing too rapid mastication of food and consequent bloat incident to excessive eating.

A further object is to form the yoke and bit from a single piece of wire bent and twisted to form, thereby allowing the device to be cheaply manufactured and sold.

A further object is to provide a combined yoke and bit comprising a neck encircling portion, upwardly and downwardly extending arms terminating in hooks, and a forwardly extending U-shaped portion forming a bit, said parts being formed from a single piece of wire bent to form and having its ends terminating in hooks at one side of the yoke and its central portion terminating in an eye at one side of the yoke and adapted to receive the hooks.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the combined yoke and bit.

Figure 2 is a vertical longitudinal sectional view through the yoke and bit.

Referring to the drawing, the numeral 1 designates the neck encircling yoke having upwardly and downwardly extending arms 2 and 3 terminating in forwardly extending hooks 4 adapted to hook over or under fence wires thereby preventing a cow or other animal from passing between the fence wires or under the same. The device is formed from a single piece of wire bent and twisted to form to reduce the cost of manufacture.

The device or yoke 1 is formed from a single piece of wire having its ends 5 and 6 terminating at one side of the yoke in hooks 8, and its central portion provided with an eye 7 terminating at one side of the yoke 1 adjacent the hooks 8 of the ends 5 and 6 where said hooks will be received for holding the yoke as a whole in closed position. The ends 5 and 6 extend upwardly and downwardly and are twisted onto the body of the wire for forming the arms 2 and 3, and bent to form the hooks 4, thence terminate in portions 9, forming the opposite side of the yoke and centrally of the side are twisted to form the forwardly extending arm 10 which supports the twisted bit portion which extends transversely towards the hook side of the yoke and terminates in the rearwardly extending twisted arm 12, the ends of which is provided with the eye 7. Where the ends of the bit 11 merge into the side members 10 and 12, rings 13 are formed which engage the sides of the animal jaws for preventing cutting and transverse movement, consequently maintaining the bit in position. The center of the bit is provided with an elongated loop 14, which gives the bit a flattened effect centrally above the tongue, thereby allowing a limited freedom of movement of the tongue without allowing excessive mastication of food.

In forming the device the eye 7 is formed centrally of the piece of wire, the arm 12 is then formed followed by the eye 13, bit 11 and the other eye 13 and arm 10. After forming the arm 10, the wire is bent to form the arms 9 of the yoke and then the arms 2 with their hooks 2 are formed, and after which the arms 5 and 6 and their hooks 8, therefore it will be seen that a single length of wire is used.

From the above it will be seen that a combined breacher yoke and bit is provided which is simple in construction, formed from a single sheet of wire bent to form whereby its ends terminate at one side thereof for the reception of an eye, and the bit is substantially rigid in relation to the yoke whereby when one of the arms 2 or 3 engages a wire, there will be an upward or downward pressure on the mouth which will cause the animal to give up the attempt to break through a fence.

The invention having been set forth what is claimed as new and useful is:—

A combined cattle breacher yoke and bit formed from a single piece of wire bent and twisted to form, said bit being U-shaped, the outer end of one arm of the U-shaped bit being twisted to form an eye, the outer end of the other arm of the U-shaped bit having its wires terminating in upwardly and downwardly extending arms adapted to engage one side of the neck of an animal, said upwardly and downwardly extending arms terminating in alined fence wire engaging arms formed by twisting the wire upon itself, the outer ends of the fence wire engaging arms terminating in hooks, the inner ends of the fence wire engaging arms terminating in outwardly offset arms extending towards each other and towards the eye of the bit carried by the outer end of one of the bit arms and hooks carried by said arms and detachably connected within the eye.

In testimony whereof I hereunto affix my signature.

JOHN A. BADURA.